Figure 1:
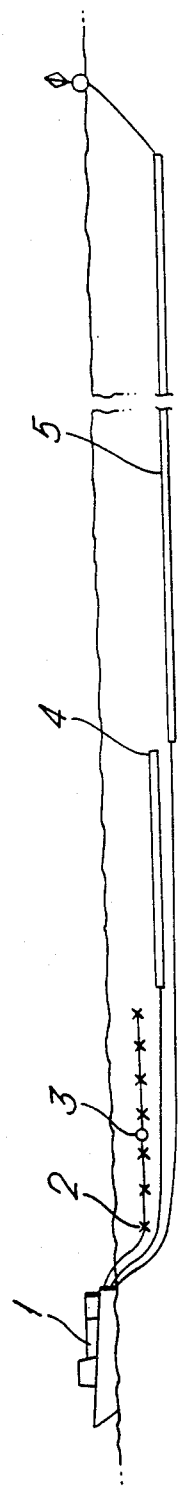

United States Patent [19]

Newman

[11] Patent Number: 4,693,336
[45] Date of Patent: Sep. 15, 1987

[54] UNDERWATER SEISMIC TESTING

[75] Inventor: Paul Newman, Westerham, United Kingdom

[73] Assignee: Horizon Exploration Limited, Swanley, United Kingdom

[21] Appl. No.: 894,756

[22] Filed: Aug. 13, 1986

Related U.S. Application Data

[63] Continuation of Ser. No. 521,121, Aug. 6, 1983, abandoned.

[30] Foreign Application Priority Data

Aug. 18, 1982 [GB] United Kingdom ............... 8223730

[51] Int. Cl.$^4$ .......................... G01V 1/00; G01V 1/38
[52] U.S. Cl. ................................... 181/111; 181/112; 367/15; 367/20; 367/154
[58] Field of Search ............... 181/107, 108, 110, 111, 181/112, 113, 115, 116, 117, 118, 119, 120; 367/15, 16, 17, 18, 19, 20, 21, 22, 23, 24, 106, 130, 144, 145, 146, 153, 154

[56] References Cited

U.S. PATENT DOCUMENTS

| | | | |
|---|---|---|---|
| 3,304,533 | 2/1967 | Huckabay et al. | 367/15 X |
| 3,379,273 | 4/1968 | Chelminski | 367/144 |
| 3,491,848 | 1/1970 | Giles | 367/20 X |
| 3,744,021 | 7/1973 | Todd | 367/23 |
| 3,864,664 | 2/1975 | Trott et al. | 367/13 |
| 4,038,630 | 7/1977 | Chelminski | 181/111 X |
| 4,087,780 | 5/1978 | Itria et al. | 367/17 |
| 4,326,271 | 4/1982 | Ziolkowski | 367/56 X |
| 4,357,689 | 11/1982 | Ruehle | 367/23 |
| 4,382,486 | 5/1983 | Ruehle | 181/118 |
| 4,476,550 | 10/1984 | Ziolkowski et al. | 367/23 X |
| 4,476,553 | 10/1984 | Ziolkowski et al. | 367/15 X |
| 4,486,864 | 12/1984 | Ongkiehong et al. | 181/111 |
| 4,500,978 | 2/1985 | Ziolkowski et al. | 181/120 |

FOREIGN PATENT DOCUMENTS

| | | |
|---|---|---|
| 0047100 | 8/1981 | European Pat. Off. . |
| 2145552 | 7/1972 | France . |
| 2473732 | 1/1980 | France . |
| 2048480 | 4/1980 | United Kingdom . |

OTHER PUBLICATIONS

Newman, P. *Watergun Fills Marine Seismic Gap*, Oil and Gas Journal, Aug. 1978, pp. 138–150.

Primary Examiner—Charles T. Jordan
Assistant Examiner—Brian S. Steinberger
Attorney, Agent, or Firm—Merchant, Gould, Smith, Edell, Welter & Schmidt

[57] ABSTRACT

A method of marine seismic investigation involves positioning or deploying at a predetermined point close to or within a multi-element seismic source array a calibration source which is an acoustic pressure wave point source which has a far-field seismic signature of broad bandwidth. The radiated pressure wave field of the calibration source (3) is weaker than that of the main source (2). The two sources are fired at separate instants within a predetermined time range, preferably with the calibration source (3) being fired about two seconds before the main source (2). The reflected response of the sub-surface strata is recorded and processed to generate seismic data. In one embodiment, the response is recorded with two hydrophone arrays - a short high-resolution array (4) and a conventional main array (5). The method can be used to determine the far-field signature of the main source array (2). It can also be used to obtain a high-resolution shallow seismic section simultaneously with a deep seismic section. Apparatus suitable for the method is described, and also a method of conducting an underwater seismic survey.

10 Claims, 2 Drawing Figures

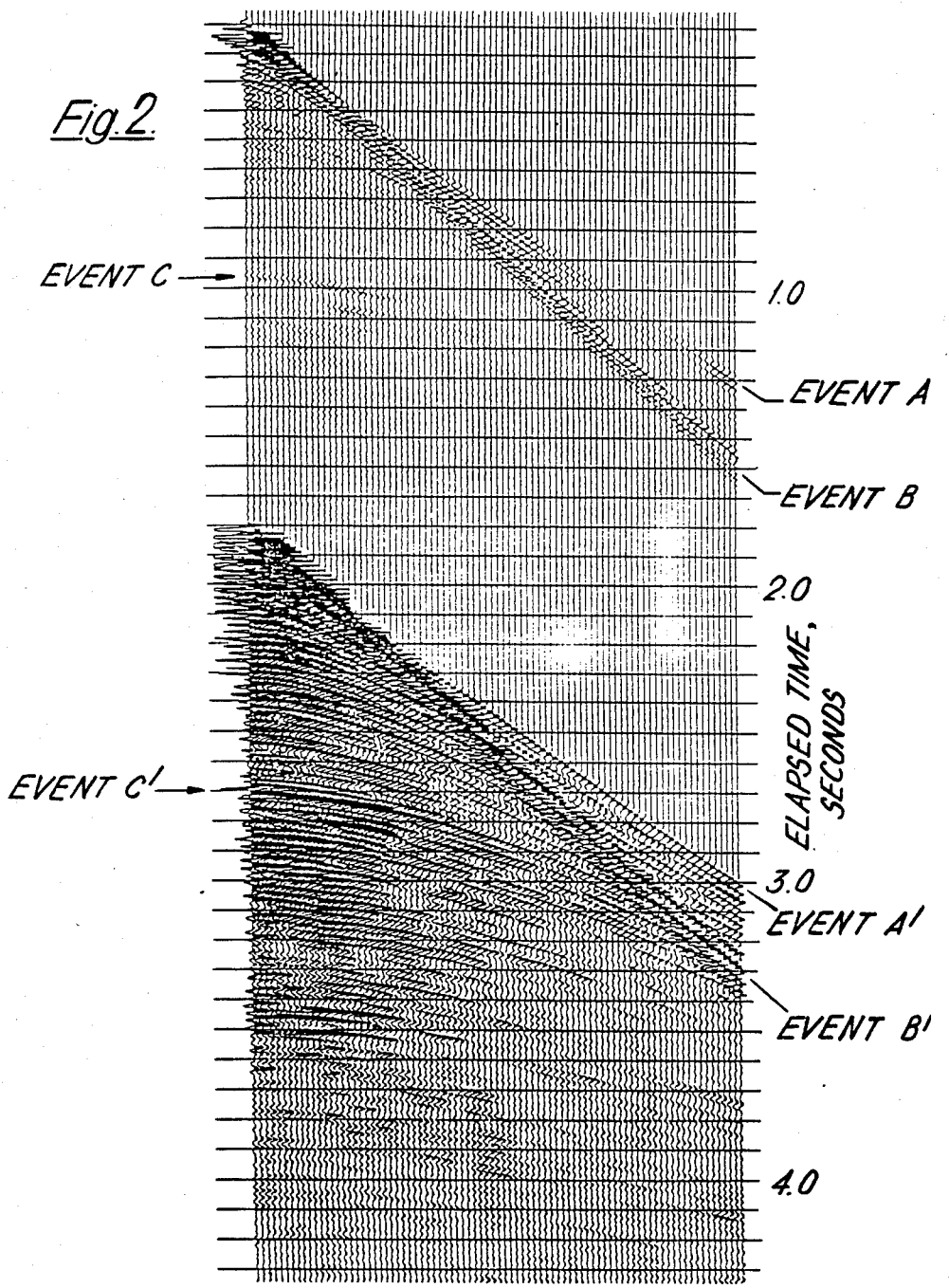

UNDERWATER SEISMIC TESTING

This is a continuation, of application Ser. No. 521,121, filed Aug. 6, 1983. now abandoned.

This invention relates to underwater seismic testing and is particularly concerned with determining (i) the far field seismic signature of a multi-element array marine seismic source, and (ii) seismic sections.

In marine seismic survey work, sub-surface geology is investigated indirectly by observing the reflective response to acoustic waves that are initiated near the surface of the water by a seismic source. A variety of explosive or implosive sources may be employed to generate acoustic pressure wave impulses of suitable intensity. A typical explosive source is a multielement array of air guns, and a typical implosive source is a multi-element array of water guns.

The acoustic pressure waves initiated by the seismic source travel through the water to the formations of interest and suffer reflection and refraction by various layers. One or more receivers is or are located so as to pick up waveforms which have been reflected, or reflected and refracted, by the formation of interest.

A key factor in the subsequent signal processing and interpretation of seismic reflection records is the pressure waveform of the impulse emitted by the source as this develops and is incident on reflecting surfaces at depths within the earth. This waveform is referred to as the far-field signature of the source.

A number of different methods have been proposed for directly measuring the far-field signature of marine seismic sources or for estimating this on the basis of measurements made in the near-field or the mid-field. An example of a technique on the latter basis is described and claimed in British patent application No. 8030645. A further approach to far-field signature measurement is to observe the emitted source signature by locating a hydrophone as deep as possible and as close as possible to the vertical beneath the axis of the seismic source.

Under practical conditions, the direct measurement of a far-field seismic source signature is intractable for a number of reasons relating to the physical extent of practical source arrays, the speed through the water of the vessel which is required for efficient conduct of a marine seismic survey, and also often by the depth of water that exists beneath the source.

The present invention aims to provide a method for determining the emitted source signature from reflected information without requiring extrapolation of radiated pressure measurements acquired in the close vicinity of a source array.

According to the present invention, there is provided a method of marine seismic investigation which comprises (1) positioning or deploying at a predetermined point proximate a multi-element seismic source array a calibration or reference source which is an acoustic pressure wave point source which has a far-field seismic signature of broad band-width and the radiated pressure wave field of which is weaker than that of the multielement array; (2) firing the multi-element array source and the point source at separate instants within a predetermined time range; (3) simultaneously recording the reflected response of the sub-surface geological strata to the multi-element array and to the point source; and (4) processing the recorded response to generate seismic data.

Although the term "point source" is used herein to describe the calibration source, it should be noted that the method of the invention is amenable to satisfactory operation when a compact cluster of sources is used as the calibration source. Within the overall scale of operation in underwater seismic testing, a compact cluster of sources approximates to a point source provided that the individual component sources in the cluster are fired simultaneously. Also, for purposes of this application, the use of the word 'proximate' to describe the relative position of the multi-element seismic source array and the calibration source is intended to include positioning of the calibration source within the array.

Because the calibration or reference source is a single point source there is no difficulty in establishing its farfield signature from a near-field measurement. This can be done by monitoring the point source with a hydrophone monitor located close to the source. Alternatively, if the characteristics of the calibration source are sufficiently stable, a single measurement of its far-field signature under suitable controlled conditions can be used for reference. For example, the point source may be operated at the desired operational depth and in deep water (i.e. >150 m) and measurements may be taken with a hydrophone at a depth of about 100 m.

The method of the invention can be used to generate valuable seismic data of different kinds. Thus in a first embodiment, the method can be used to determine accurately the far-field signature of the calibration source. Given this data, or with a calibration source of known signature, the method of the invention can be used, in a second embodiment, to determine the far-field signature of the multi-element source array. When this is determined, the method can be used, in a third embodiment, to carry out seismic surveys in order to obtain simultaneously a high-resolution shallow or first seismic section and a deep or second seismic section. In this third embodiment, the sub-surface response is recorded by the hydrophone arrays—one is a conventional hydrophone streamer the output of which is processed essentially to generate the deep seismic section; and the other is a shorter hydrophone streamer which will be positioned (trailed) between the source array and the conventional hydrophone array.

In the first embodiment described above, the signature of the calibration source can be obtained by processing the signal generated by a single hydrophone located close to the calibration source. Such a hydrophone monitor can be employed with advantage in all the embodiments of the invention.

In practising the present invention, a multielement array of discrete seismic sources is supplemented by an additional point source element having independent means of firing. This additional element, which can be referred to as a calibration source, has a far-field seismic signature which is characterised by a broad and preferably substantially uniform frequency spectrum relative to that of the multielement array, while the radiated pressure wavefield of the calibration source is weaker, and preferably significantly weaker, than that emitted by the multielement array.

Preferably, the point source is fired before the multi-element array. A convenient time separation between these two firings is from 1 to 5 seconds; preferably, the point source is fired about 2 seconds before the firing of the multi-element array.

Alternatively, the point source may be fired after the firing of the multi-element source. With this embodiment, the time interval between the two firing events is preferably from 3 to 15 seconds, more preferably about 5 to 8 seconds, and most preferably about 6 or 7 seconds.

The location of the point source with respect to the multi-element array is preferably such that, taking into account any motion which will occur in the time interval between the two firings, the locus of firing of the point source is coincident with the locus of firing of the multi-element array. Conveniently, the point source is held at the same depth as the multielement array and can effectively be part of that array provided that the point source is given independent means of firing.

The multi-element array and the point source are preferably located relatively close to the water surface, e.g. at a depth of about 5 metres. The detectors used to record the reflected response of the sub-surface geological strata can be conventional multi-channel hydrophone arrays contained within a submerged stream-er such as is normally employed in marine seismic survey work.

In one preferred embodiment of the present invention, the calibration source is located close to the centre of the multi-element array and is operated at a similar depth in the water. It is fired independently at a time that procedes that of firing the main array by a few seconds, preferably about 2 seconds. Each seismic recording then comprises the reflected responses relating to two different sources, these responses being separated in time by the known interval between firing the sources. Because the pressure wave field radiated by the calibration source is weaker than that of the main array, interference between late reflections from this source and early reflections from the main, multielement array source are not significant. In this preferred embodiment, a special array of hydrophones contained wtihin a relatively short multi-channel streamer and deployed at a close distance from the source array is used as the detector. This short length of streamer, will be referred to as a high-resolution streamer.

During the data acquisition phase of a marine seismic reflection survey, shots are fired and recordings are made on a regular time or distance basis. Typically, shots are fired at distance intervals of 25 meters along the ground, corresponding to a time cycle of about 10 seconds at normal survey vessel speeds. The distance covered between firing the calibration source and the main multi-element source array is thus about 5 meters, assuming a time interval of 2 seconds between the firing events. Thus by locating the calibration source 5 metres ahead of the main multi-element array centre, and by addressing appropriate hydrophones in the high-resolution streamer, it is possible to obtain in a single recording the response of the same sub-surface region from two different seismic sources. Given that the far-field signature of one of the sources is known, that of the other can be derived from the recorded information. When both far-field signatures are known, the calibration source can function as a seismic source for generating a high resolution shallow seismic section, and the multielement array can function as a seismic source for generating a deep seismic section as outlined in the third embodiment described above.

In practice, lateral changes in sub-surface geology are very rarely significant over distances of a few metres, so that the precise location of the calibration source and the hydrophones selected for observations is not critical in practising the method. The use of a special high-resolution streamer is not essential in carrying out the second embodiment as described hereinbefore, as recordings made with a conventional streamer hydrophone array can be used, in which case the influence of these arrays in modifying the waveform of the reflected source signature would be taken into account automatically. However, use of the high-resolution streamer offers an additional important advantage in providing data that, from the calibration source, is capable of yielding great detail concerning the shallow sub-surface geology.

According to a second aspect of the present invention, there is provided apparatus for use in underwater seismic exploration, which comprises: (a) a multi-element source array ; (b) a calibration source positioned close to or within the array, said calibration source being an acoustic pressure wave point source having a far-field seismic signature of broad bandwidth and the radiated pressure wave of which is weaker than that of the array; (c) a relatively small multi-channel hydrophone array; and a main hydrophone array.

According to a third aspect of the present invention, there is provided a method of conducting an underwater seismic survey using apparatus as described in the second aspect in conjunction with signal processing apparatus, which method comprises:

(1) trailing the multi-element source array, the calibration source, the two hydrophone arrays and a single hydrophone monitor behind a vessel, the source array and calibration source and single hydrophone monitor being relatively close to the stern of the vessel, with the small hydrophone array furthest astern and the main hydrophone array furthest astern;

(2) firing the calibration source and processing the output of the hydrophone monitor to determine the far-field signature of the calibration source;

(3) firing the calibration source and the multielement source array at separate instants within a predetermined time range and processing the output of the small hydrophone array to determine the far-field signature of the multi-element source only; and (4) firing the calibration source and the multielement source array at regular intervals maintaining a substantially constant time delay between the firing of the two sources each time they are fired, and processing the signals derived from sub-surface reflections of the calibration source pressure wave to generate a shallow seismic section and processing the signals derived from sub-surface reflections of the multi-element source array to generate a deep seismic section. Preferably, in step (4) of this method, the output of the small hydrophone array is used in the generation of the shallow seismic section while the output of the main hydrophone array is used to generate the deep seismic section.

Derivation of the main source array signature from recorded signals that correspond to reflected pressure waveforms can best be seen from a frequency domain representation of the convolutional model that is widely accepted as accurately describing the seismic reflection process. Denoting the sub-surface sequence of reflection coefficients as the time function $h(t)$, the signature of the main source array $s(t)$, and the signature of the calibration source $c(t)$, the reflected pressure waveform at a hydrophone is described by $f_s(t)=s(t)*h(t)$ or $f_c(t)=c(t)*h(t)$ respectively, where the asterisk denotes convolution. $f_s(t)$ and $f_c(t)$ are separable in the proposed scheme by selecting suitable time windows of the recording, corresponding to the earlier response obtained from the calibration source, and a time window of similar duration that relates to the later response obtained from the much stronger main source array.

Expressed in the frequency domain, convolution is equivalent to multiplying the corresponding Fourier transforms of the time waveforms. Then $F_s(w)=S(w).H(w)$ and $F_c(w)=C(w).H(w)$. The Fourier spectrum of the unknown source array signature, $S(w)$, can then be determined from:

$$S(w)=(F_s(w)\cdot C(w))/F_c(w)$$

where $C(w)$ is the Fourier spectrum of the known or independently measured calibration source signature.

The mathematical solution to the above equation can be obtained alternatively using either time domain or frequency domain methods that are well known in the signal processing art. Most commonly it will be required to determine the inverse expression, $S(w)^{-1}$, which corresponds to a deconvolution operator in the time domain that will remove from the main recording adverse aspects of the main source array signature. None of these operations is regarded as original.

In preferred embodiments of the invention the calibration source will consist of a water gun, this being an implosive seismic source having a particularly stable signature with a suitably broad and uniform frequency spectrum.

The invention will be illustrated further with reference to the accompanying drawings, in which:

FIG. 1 is a diagrammatic illustration of a preferred version of the recording configuration; and FIG. 2 shows an example of a waveform recorded in accordance with the present invention.

Referring now to FIG. 1 of the drawings, there is shown a seismic recording vessel 1 which trails a multi-element seismic source array 2 which contains a calibration source 3 of the type described above. This source is a water gun which can be fired independently of the elements comprising the multi-element source array 2. A high-resolution streamer 4 and a main hydrophone streamer 5 are also trailed by the vessel 1. High-resolution streamer 4 is positioned behind the multi-element array 2 at a depth similar to or slightly greater than that of the latter. Conveniently, the array 2 can be 20 to 100 meters in length and held at a depth of 5 meters, while the high-resolution streamer 4 can be about 100 meters in length and held at a depth of 5 to 10 metres. The main hydrophone streamer 5 is trailed behind high resolution streamer 4 and can be 1.5 to 3 kilometers in length and can be at a depth of about 10 to 15 meters.

In use, the calibration source 3 is fired some 2 seconds before the main multi-element source 2, and both the main streamer 5 and the high-resolution streamer 4 are used to record the response of the sub-surface geological strata. The far-field seismic signature of the array 2 can then be calculated in the manner described hereinbefore, and thereafter the method can be used to generate simultaneously a high-resolution shallow seismic section and a conventional deep seismic section. Because of the time delay between the firing of the calibration source and of the main source array, it is relatively simple to effect the signal processing required to generate the two seismic sections; no special processing techniques are required.

To better illustrate the nature of the seismic records obtained using the proposed technique, FIG. 2 shows the waveforms recorded from the main streamer for a single pair of shots, in which the delay between firing the calibration source and the main array was 1.7 seconds. For this example the seismic streamer contained 84 hydrophone arrays at intervals of 25 meters between arrays and with the closest hydrophones 100 metres from the source array centre.

In FIG. 2 certain events have been identified following initiation of the calibration source at time $=0$. Thus, events A and A' are signals that have been refracted through the sea floor following the firing of the calibration source and the main source array respectively. Events B and B' correspond, similarly, to a channeled wave through the water layer. Events C and C' are typical of the numerous reflected signals returned from depth within the geologic section underlying the sea floor. These reflected signals are characterised by the hyperbolic alignments that they adopt when viewed as a function of source-hydrophone offset distance.

It is clear that in FIG. 2 each waveform virtually repeats itself after an interval of 1.7 seconds, the differences in response resulting from differences in magnitude of the two seismic sources and differences in detail of the radiated pressure impulses. As the pressure impulse that is radiated by the calibration source is known, or can be reliably measured, each individual waveform of FIG. 2 can be used as the basis for calculating the main source array signature. Alternatively a single estimate can be made or an average of estimates obtained using one or a few selected waveforms.

I claim:

1. A method of marine seismic investigation which comprises:
    (1) positioning a reference source at a predetermined point proximate a multi-element seismic source array wherein said reference source is an acoustic pressure wave point source having a far-field seismic signature of broad band-width and a radiated pressure wave field having a strength less than that of said multi-element array;
    (2) firing the multi-element source array and the point source at separate instances within a predetermined time range;
    (3) simultaneously recording seismic signals reflected from sub-surface geological strata in response to firing of the multi-element source array and the point source array wherein the recording is carried out using two hydrophone arrays including a first hydrophone array contained in a conventional hydrophone streamer and a second hydrophone array contained in a streamer having a length less than said conventional streamer and positioned between the source array and the conventional hydrophone streamer; and wherein said second array is a high resolution multi-channel hydrophone array; and
    (4) processing the recorded response so that (i) the response derived from the firing of the reference source is used to generate a high-resolution first seismic section and (ii) the response derived from the multi-element source array is used to generate a second seismic section.

2. A method according to claim 1, wherein said second hydrophone array is approximately of 100 meters in length.

3. A method according to claim 1, wherein the first bydrophone array is 1.5 to 3 kilometers in length.

4. A method according to claim 1, wherein a water gun having a stable implosive seismic signature is used as the point source.

5. A method according to claim 1, in which a compact cluster of stable seismic sources is used to constitute the point source.

6. A method according to claim 1, wherein a single hydrophone is employed at a location close to said reference source in order to monitor said reference source.

7. Apparatus adapted for towing behind a survey vessel for generating seismic impulses in a body of water and for detecting reflected waveforms of subsurface geological strata to said seismic impulses comprising:
   (a) a multi-element source array (2) for generating a pressure wave when fired;
   (b) a reference source (3) positioned proximate the multi-element source array (2), said reference source consisting of an acoustic pressure wave point source having a far-field signature of broad band-width and a radiated pressure wave field having a strength less than that of the multi-element source array (2);
   (c) a main hydrophone array (5) for detecting waveforms; and
   (d) a second hydrophone array (4) for detecting waveforms with said second array being a multi-channel array smaller than said main array whereby said main array and said second array detect reflected and refracted waveforms generated by said multi-element source array and said reference source.

8. Apparatus as claimed in claim 7, which further comprises a single hydrophone monitor in addition to said main hydrophone array and said second hydrophone array located close to the reference source.

9. A method of conducting an underwater seismic survey using apparatus including (a) a multi-element source array; (b) a reference source consisting of an acoustic pressure wave point source having a far-field signature of broad bandwidth and a radiated pressure wave field having a strength less than that of said multi-element source array; (c) a main hydrophone array; (d) a multi-channel hydrophone array; (e) a hydrophone monitor and (f) signal processing apparatus, which method comprises:
   (1) trailing the multi-element source array, the reference source, the two hydrophone arrays and the signal hydrophone monitor behind a vessel, the source array and reference source and single hydrophone monitor being positioned in a first location zone proximate the stern of the vessel, the main hydrophone array being positioned in a second location zone remote from the stern of said vessel; and the multi-channel hydrophone array being positioned in a third location zone intermediate said first location zone and said second location zone;
   (2) firing the reference source and processing the output of the hydrophone monitor to determine the far-field signature of the reference source;
   (3) firing the reference source and the multi-element source array at separate instants within a predetermined time range and processing the output of the multi-channel hydrophone array to determine the far-field signature of the multi-element source array; and
   (4) firing the reference source and the multi-element source array at regular intervals maintaining a substantially constant time delay between the firing of the two sources each time they are fired, and processing the signals derived from sub-surface reflections of the reference source pressure wave to generate a first seismic section and processing the signals derived from sub-surface reflections of the multi-element source array to generate a second seismic section.

10. A method according to claim 9, wherein in step (4) the output of the multi-channel hydrophone array is used in the generation of the first seismic section while the output of the main hydrophone array is used to generate the second seismic section.

* * * * *